Nov. 30, 1965   B. F. MEAD   3,220,750
TRAILER COUPLING
Filed Nov. 26, 1963   3 Sheets-Sheet 1

INVENTOR
Benjamin F. Mead
BY
ATTORNEY

Nov. 30, 1965

B. F. MEAD 3,220,750

TRAILER COUPLING

Filed Nov. 26, 1963

INVENTOR

Benjamin F. Mead

BY *Richmond A. Hayes*

ATTORNEY

Nov. 30, 1965                B. F. MEAD                 3,220,750
                          TRAILER COUPLING
Filed Nov. 26, 1963                                 3 Sheets-Sheet 3

INVENTOR
Benjamin F. Mead
BY
ATTORNEY 3,220,750
TRAILER COUPLING
Benjamin F. Mead, Warren, Pa.
Filed Nov. 26, 1963, Ser. No. 325,880
3 Claims. (Cl. 280—423)

This invention relates to load carrying vehicles of the type adapted to sustain heavy loads and is particularly directed to and concerned with the means by which two such vehicles are coupled.

The present invention represents a specific and important improvement over the disclosure of Ernest Ellberg as set out in his Patent No. 2,425,521, dated August 12, 1947.

The above patent purports to position the mat of a gooseneck trailer hitch in the box of a truck in such manner that it cannot move or slide about in the box during a hauling operation. However, due to the fact that the mat intended to rest on the box bed must be mounted from the open top, it of necessity must be of a somewhat lesser proportion than the interior box dimensions. This is particularly true when it is considered that truck bodies for hauling large loads of loose material are filled by means of power equipment (scoops or shovels—for example) which have a tendency to dent or otherwise distort the box walls. Thus, an even greater difference between mat size and box interior dimensions must be considered if the above patented disclosure is to be capable of normal and continued use. In other words, a mat must be of sufficiently lesser dimensions than the box to enable ready mounting and removal.

As above stated, and as indicated in the above patent, trailers to which his invention is applicable are required in the hauling of large earth moving vehicles. This, of course, necessitates a long ruggedly built trailer which, with its vehicle load, represents many thousand pounds in weight. To safely haul such a trailer requires use of a strong accurate coupling between it and the towing vehicle. Should there be any lateral play or leeway in the fit of mat and truck box, this will be many times multiplied at the wheeled end of the trailer. The effect is to create a whipping or zig-zag swinging movement. Due to the over-all length of the trailer and towing vehicle and their combined weight, there must be no looseness whatsoever in the coupling.

It is believed the present inventor, assignee of record of the above patent and manufacturer of such equipment, has devised an improved coupling mat for safe hauling use and this represents one of the many advantages and objects of the present disclosure.

Another object and advantage of the invention lies in the provision of a mat that may be freely mounted in a truck body and subsequently engaged with the walls and tail gate of the body.

A further object is to provide manually controlled means for expanding and locking the mat in pressure engagement with at least two opposite sides or walls of a truck body.

Other objects and advantages will be more fully understood and appreciated from a consideration of the following specification, taken in conjunction with the accompanying drawings; and in which FIG. 1 is a side elevational view of a joined semi-trailer and truck provided with a coupling unit embodying one form of the invention;

Figure 1:
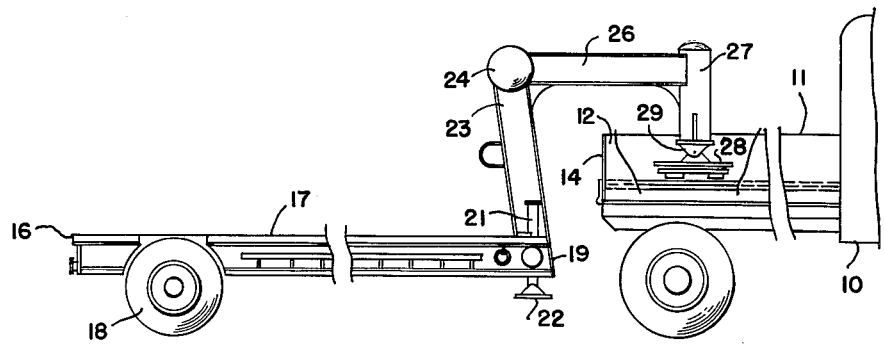

Referring more particularly to the drawings, the reference numeral 10 is employed to generally designate a truck. To illustrate one application of use of the invention, the truck 10 is shown to include a dirt or other material receiving box or body 11, which, through conventional mechanism, is capable of being elevated for the purpose of displacing the box contents. The side walls 12, bottom 13, and hinged tail gate 14 are all common structure in trucks of this type; in fact, the truck illustrated constitutes no part of the invention. A trailer 16 is shown to be of the heavy load carrying type and includes the usual platform 17, located as near to the ground as possible to facilitate loading and unloading large and heavy pieces of equipment. Towards the rear of the trailer, sets of dual wheels 18 are shown. The forward end of the trailer 19 is provided with a pair of adjustable legs 21. These legs may have self-leveling feet 22. They are adapted to be secured in any desired extended position through the provision of pins projecting through selected apertures. The pins are located above the trailer body when it is desired to maintain the legs in a raised position (FIG. 1), and beneath the trailer body when the legs serve to sustain the weight of the forward end of the trailer.

The trailer 16 is adapted to be coupled to the powered towing vehicle by means of a draw bar which, for purposes of the invention, is of gooseneck type. This coupling is located at the forward end 19 of the trailer and includes spaced uprights 23. These uprights are so designed as to be incapable of any bending or twisting with respect to the trailer. The uprights 23 are connected at their upper ends by a cross-bar 24. Joined to the bar 24, at its point of jointure with the uprights, is a pair of converging beams 26. At substantially the point of meeting of these beams, they are rigidly joined to the upper end of a vertically disposed post 27. It will be understood that the uprights, beams, and post are of such structure as to be capable of standing any load stress to which the trailer may be subjected in the course of its use.

Figure 3:
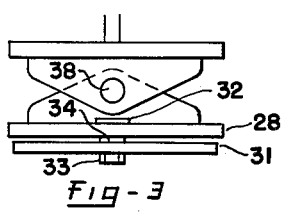
FIG. 3 is an enlarged fragmentary view, partly in section, and shows one form of a tilting connection between the trailer post and box mounted mat.

Connecting the lower end of the post 27 with a disk 28 is structure 29 which enables a measure of tilting of this disk in the lengthwise direction of a towing truck. One form of such a tilting structure is suggested by the detail in FIG. 3. Directly beneath the disk 28 is a generally rectangular plate 31 which is joined thereto by a centrally disposed bolt 32 and nut 33. A suitable washer 34 is interposed between disk 28 and plate 31 to reduce frictional contact during relative swiveling movement of these parts.

Attention is now directed to the mat, generally designated by the numeral 36, and pertaining to which the present invention is specifically concerned. For purposes of explanation, the mat consists of two reversely arranged units which are connected and in part made integral by means of parallel channel-like beams 37 which, as suggested in FIGS. 5 and 6, extend crosswise of the mat. The side walls 38 of these beams project upwardly and are welded or otherwise made integral with the under surface of plate 31. In other words, these beams extend laterally beyond the ends of this plate and together constitute the base structure of the mat which is joined, as above described, to the post 27.

Figure 2:
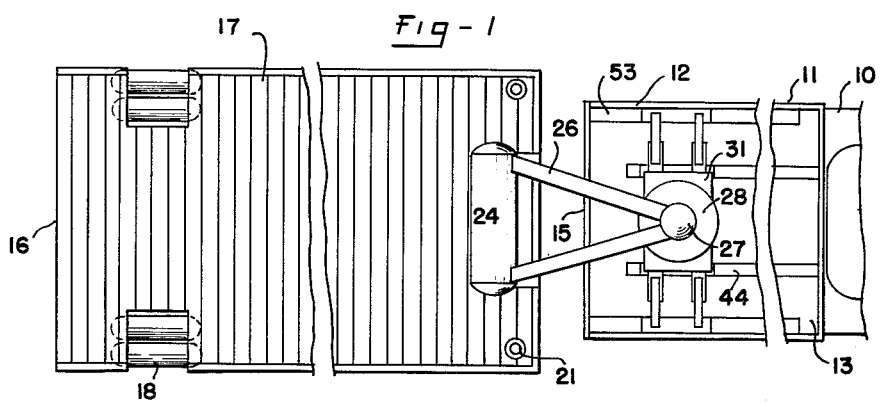
FIG. 2 is a top plan view of the structure shown in FIG. 1.
Figure 4:
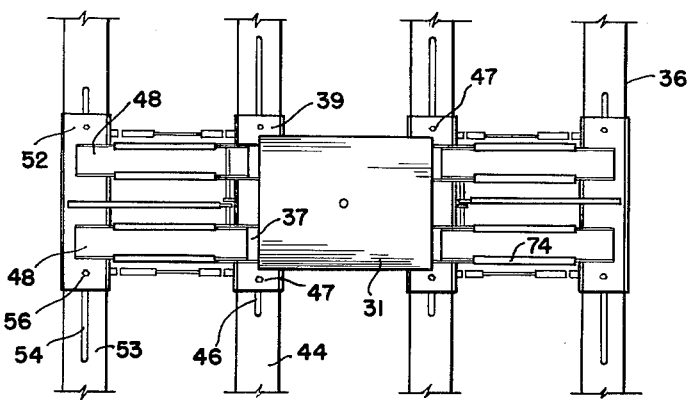
FIG. 4 is an enlarged top plan view of the mat as it appears when first inserted into the box of the truck.
Figure 7:
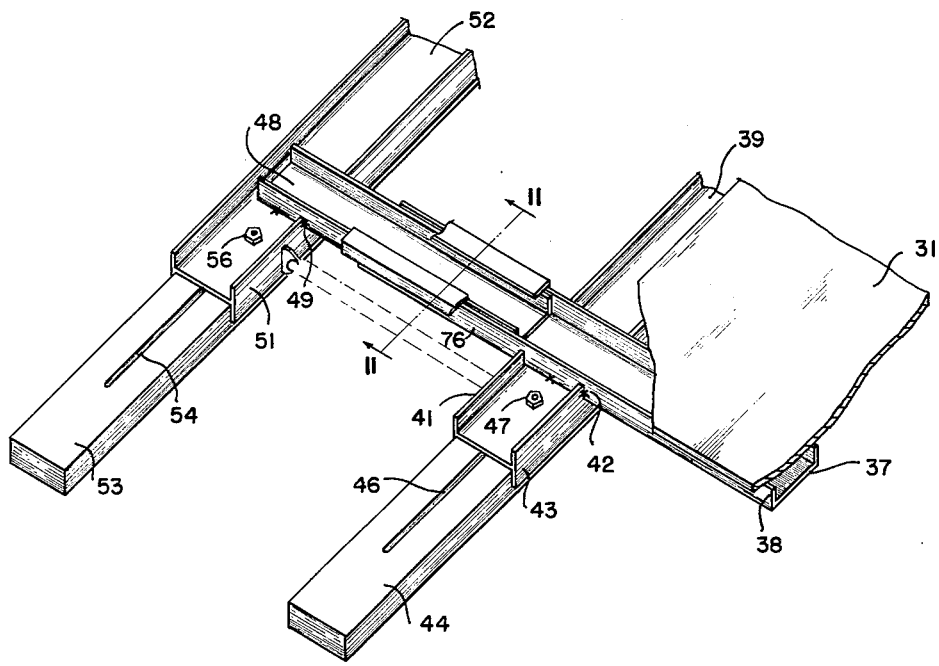
FIG. 7 is a fragmentary perspective view of that portion of the mat shown in FIG. 5.

Referring particularly to the portion of the mat shown in FIG. 7, it will be noted that there is an I-beam 39 arranged at right angles to the beams 37 and that the upper side flanges 41 thereof are cut away or notched, as at 42, to receive the base walls of beams 37 on the base wall of the I-beam 39 and be permanently joined thereto. This I-beam may partially underlie the end of plate 31 and extends beyond its side limits, substantially as shown. The downwardly directed flanges 43 of this beam create a channel in which an elongated bar 44 is located. For purposes of the invention, this bar is of a lesser length than the inside length of the box or body 11. A pair of lengthwise slots 46 are provided in this bar which are visible beyond the ends of the I-beam 39. Bolts 47 project through suitable openings in the I-beam and into and through the slots 46. This enables securing the bar to the I-beam in a forwardly or rearwardly extended position with respect to the base portion of the mat (see FIG. 2).

Figure 5:
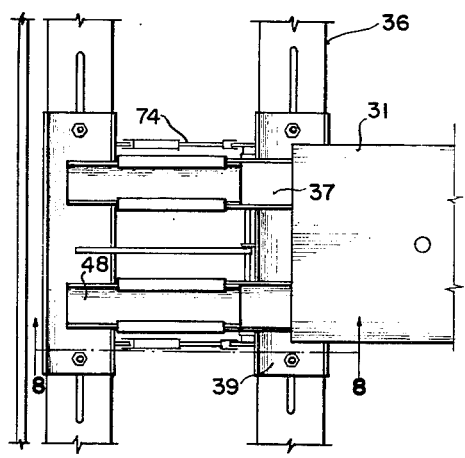
FIG. 5 is an enlarged top plan view of approximately one-half of the mat showing an outer bar in retracted position.
Figure 6:
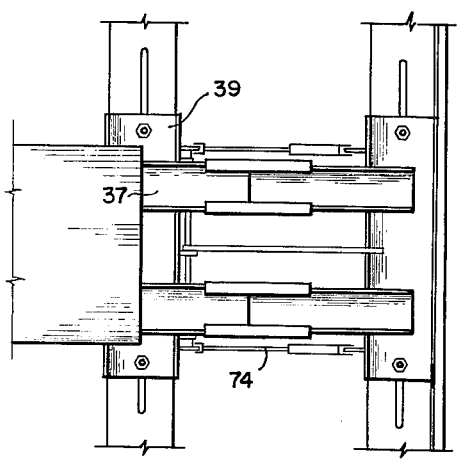
FIG. 6 is a view similar to FIG. 4 and shows the other half of the mat with its outer bar extended to engage a wall of the truck body.

Referring to FIGS. 5, 6, and 7, there are channel members 48 that fit within the channels of the beams 37. These are relatively short members and are intended to be freely slidable in the direction of their length. The free end of each member projects through a notch 49 in the inner side flange 51 of a further I-beam 52. Here again, the base wall of member 48 rests on the web or base of I-beam 52 and is permanently joined thereto, as by welding. Mounted in the lower channel-like portion of beam 52 is a further bar 53 which extends in both directions well beyond the ends of this beam. A pair of lengthwise slots 54 are provided in this bar and, by means of bolts 56, serve to locate it in a forwardly or rearwardly position with respect to the base portion of the mat. The other half portion of the mat is shown in FIG. 6 and in all respects duplicates the part above described. It will, of course, be appreciated that the beams 37 tie these parts together and to the swivel plate 31.

Figure 8:
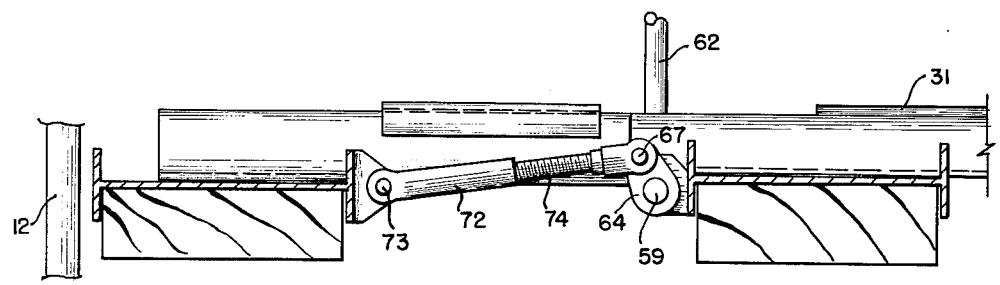
FIG. 8 is an enlarged, detailed, side elevational view of one of the devices for operating the outer bars of the mat, being taken as suggested by the line 8—8 of FIG. 5.
Figure 9:
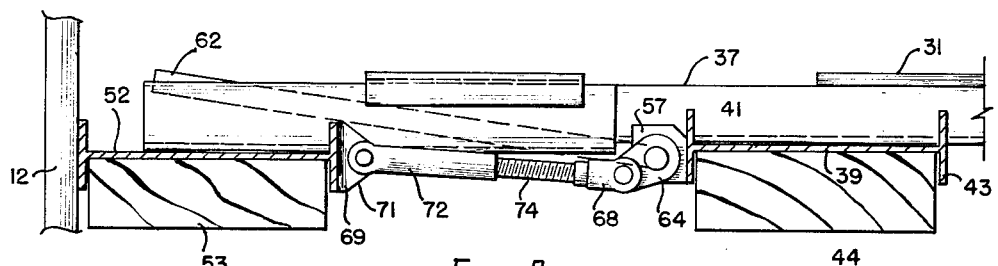
FIG. 9 is a view similar to FIG. 8 showing the same bar extended by the operating device into engagement with a wall of the truck box.
Figure 10:
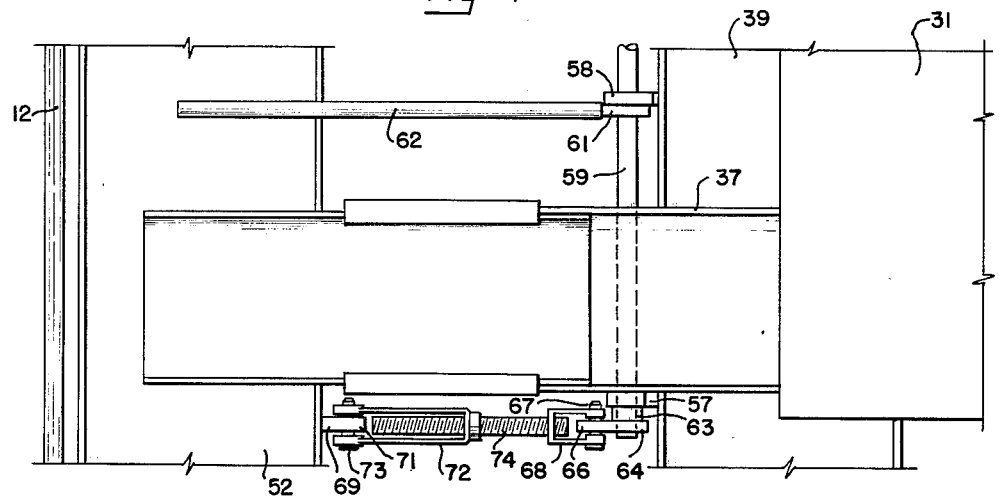
FIG. 10 is a fragmentary plan view of a part of the mat and shows the location and arrangement of the manually operable device for adjusting the laterally extendable bars (see FIGS. 5 and 6)

As has been stated, it is intended that the mat be expandable and extendable to snugly fit the interior walls of a truck box and to this end, in part at least, attention is now particularly directed to FIGS. 8, 9, and 10. In this portion of the description it will be kept in mind that the beams 37, I-beams 39, and plate 31 form an integral whole by reason of their being permanently joined. The structure for laterally extending the I-beams 52 and their carrying bars 53 includes the following structure. Secured to the flange 41 of each of the I-beams 39 are end and intermediate bearings 57 and 58, respectively. A shaft 59 is carried by these bearings and extends beyond the endmost thereof, as clearly shown in FIG. 10. One side of each of the bearings 57 is also joined to the outer flange 38 of each beam 37. In fact, due to the need for absolute rigidity of these bearings, they may be considered to be a fixed or integral part of the mat. Adjacent the intermediate bearing 58 is a collar 61 secured to the shaft 59. This collar secures one end of a swing rod 62 and enables manually rotating the shaft 59 at least through ninety degrees. The ends of the shaft beyond the bearings 57 are fitted with spacer sleeves 63 and links 64. The extended portion 66 of each link is apertured to receive a pin 67. A yoke 68 straddles the portion 66 and by means of this pin is joined to the link. Secured to the inner flange 51 of each I-beam 52 are blocks 69, each of which includes an inwardly extending apertured portion 71. A yoke 72 straddles the portion 71 and is pivotally joined thereto by a pin 73. A rod 74, having reversed threads at its ends, connects yokes 68 and 72. This structure is of the nature of a turnbuckle and enables adjustment to meet the space requirements between I-beams 39 and 52. It is pointed out that such adjustments may be increased or decreased by a change in the length of the portion 66 of link 64 carried by the shaft 59.

Figure 11:
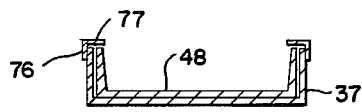
FIG. 11 is a fragmentary transverse sectional view taken substantially on the line 11—11 of FIG. 7.

As shown in FIG. 11, one means by which the channel members 48 are confined to their sliding fit within the beams 37 is through the use of angle bars which are secured along their corresponding flanges 76 to the flanges 38 of beams 37. The horizontal flanges 77 of these bars overlie the top edges of members 48 and thus prevent vertical displacement. Other means may be employed to maintain member 48 in free slidable engagement with its related beam 37, but the present arrangement appears to serve the intended purpose.

The present disclosure of the invention, by way of illustration, presupposes that an excavating project is to be performed which necessitates transporting an excavating machine, and at least one dump truck, to the place of work. It may be assumed that the trailer 16 is self-supported at the time the excavating machine is placed upon it. Following this, the dump truck 10 is attached to the trailer. This is accomplished by first lowering the tail gate of the truck and slightly tilting the pivotal unit of the trailer carried by the post 27. The truck may now be backed into position before the trailer to bring the supporting bars into the truck box and in or near contact with the floor 13 thereof. The trailer and truck appear substantially as shown in FIG. 1. The tail gate 14 is swung into and secured in closed position. However, since the over-all dimensions of the mat are less than the interior dimensions of the truck box, it is essential that adjustment be made. As presently envisioned, the bars 44 are moved forwardly to engage the front wall of the box and are secured by bolts 47 in this position. Similarly, bars 53 are moved rearwardly to engage the tail gate 14, being secured in this relationship by bolts 56. Any forward or backward movement of the mat with respect to the box is now eliminated. It will be noted that the mat, however, does not at this point engage the side walls of the box.

Assuming that the turnbuckle devices have been properly adjusted, it now only becomes necessary to swing the rods 62 from the position of FIG. 8 to that of FIG. 9. This movement, through links 64, etc., laterally extend bars 53 into engagement with the sides of the truck box. The toggle-like action of the parts controlled by the rods 62 assures the bars being held in pressure engagement with the box walls.

From the foregoing, it is evident that the present invention enables securing a trailer mat in engagement with all four walls of the box of a truck without regard for any variance in box dimensions. Further, the trailer coupling mat is initially freely insertable into the box and may then be expanded in all directions to provide a close, tight and non-chucking engagement as between truck and trailer. Although it is appreciated that variations of the structure shown and described may be made, it is considered that such variations are well within the present inventive concept insofar as they are encompassed by the following claims.

Having thus set forth my invention, what I claim as new and for which I desire protection by Letters Patent is:

1. In a gooseneck type coupling for joining a semi-trailer to a powered vehicle equipped with a load receiving box, a generally flat rectangular mat adapted to rest on the bottom of said box and forming part of said coupling, said mat consisting of a central portion forming a swivel part of said coupling, spaced parallel beams extending in the direction of the length of said box, cross members carried by said swivel part mounting said beams, means enabling endwise adjustment and the selective securing of said beams in engagement with the front wall and tail gate of said box, and means directly associated with the laterally outermost beams of said mat, said means including manually operable structure for laterally moving these beams into engagement with the side walls of said box.

2. In a gooseneck type coupling for joining a semi-trailer to a powered vehicle equipped with a load receiving box, a generally flat rectangular mat adapted to rest on the bottom of said box and forming part of said coupling, said mat consisting of a central portion forming a swivel part of said coupling, spaced parallel beams extending in the direction of the length of said box, cross members carried by said swivel part mounting said beams, means enabling endwise adjustment and the selective securing of said beams in engagement with the front wall and tail gate of said box, linkage connecting the outer beams of said mat with the inner beams, including manually operable means for laterally extending said outer beams into engagement with the side walls of said box whereby to prevent horizontal displacement of said mat in any direction with respect to the interior area of said box.

3. In a gooseneck type coupling for joining a semi-trailer to a powered vehicle equipped with a load receiving box, a generally flat rectangular mat adapted to rest on the bottom of said box and forming part of said coupling, said mat consisting of a central portion forming a swivel part of said coupling, spaced parallel beams extending in the direction of the length of said box, cross members carried by said swivel part mounting said beams, means enabling endwise adjustment and the selective securing of said beams in engagement with the front wall and tail gate of said box, turnbuckle structure connecting the outer beams with the inner beams of said mat, said structure being adjustable to determine the extent to which said outer beams may be laterally extended and manually operable means for adjusting and extending said outer beams to secure them in pressure contact with the side walls of said box.

References Cited by the Examiner
UNITED STATES PATENTS

| | | | |
|---|---|---|---|
| 2,425,521 | 8/1947 | Ellberg | 280—438 |
| 3,164,398 | 1/1965 | Lugash | 280—423 |
| 3,164,399 | 1/1965 | Lugash | 280—423 |

LEO FRIAGLIA, *Primary Examiner.*

BENJAMIN HERSH, *Examiner.*